350-269 SR
7/10/79 OR 4,160,583

United States Patent [19]

[11] 4,160,583

[45] Jul. 10, 1979

Ueda

[54] ELECTROSTATIC DISPLAY DEVICE

[75] Inventor: Hirotada Ueda, Kobe, Japan

[73] Assignees: Displaytek Corporation; Daiwa Shinku Corporation, both of Japan

[21] Appl. No.: 891,115

[22] Filed: Mar. 28, 1978

[30] Foreign Application Priority Data

Apr. 1, 1977 [JP] Japan ............................ 52/41452[U]
Oct. 8, 1977 [JP] Japan ............................ 52/135345[U]

[51] Int. Cl.² ............................ G02F 1/00

[52] U.S. Cl. ............................ 350/269; 350/359

[58] Field of Search ............... 350/359, 360, 269, 266, 350/285, 270

[56] References Cited

U.S. PATENT DOCUMENTS 3,553,364 1/1971 Lee ............................ 350/269
3,897,997 8/1975 Kalt ............................ 350/269 X
3,989,357 11/1976 Kalt ............................ 350/360
4,094,590 6/1978 Kalt ............................ 350/360 X

*Primary Examiner*—Andrew J. James
*Assistant Examiner*—James W. Davie
*Attorney, Agent, or Firm*—Wenderoth, Lind & Ponack

[57] ABSTRACT

An electrostatic display device includes a casing with a pair of side walls, a fixed electrode having a cylindrical surface and a ridge at the upper most portion of the surface, a pair of flaps of resilient sheet electrode standing adjacent to the fixed electrode along the inner surface of the side walls, and a layer of insulating material provided on the outer surface of the fixed electrode and/or the inner surface of the resilient sheet electrode, whereby upon applying a voltage to the electrodes, the resilient flaps are attracted to the cylindrical surface of the fixed electrode and cover the same in a moment, changing the appearance of the device.

4 Claims, 11 Drawing Figures

ELECTROSTATIC DISPLAY DEVICE

The present invention relates to an electrostatic display device having a resilient sheet electrode, a fixed electrode with a curved surface and an insulating layer interposed between the two electrodes, whereby upon the application of a voltage between the two electrodes, the resilient sheet electrode is attracted to and covers the curved surface of the fixed electrode, changing the appearance of the device.

U.S. Pat. No. 3,897,997 to Kalt discloses one of such electrostatic display devices. The device, referring to FIG. 1, has a fixed electrode 22 with a cylindrical surface covered with a thin layer 25 of an insulating material, and a resilient sheet electrode 24 also covered with thin insulating layers. The resilient electrode and the fixed electrode are fixed to a base 21 so that the face of the resilient electrode stands adjacent to the fixed electrode in contact therewith at a portion A. The resilient electrode 24 consists of, for example, a resilient polymer film as a core such as polyethylene terephthalate film with an electrically conductive metal like aluminium vacuum deposited thereon, and bonded to the base 21 at one end 23 thereof. A power source 26 is connected to both the electrodes through lead wires 27 so that a d.c. voltage can be applied between the electrodes.

When there is no voltage applied between the fixed and resilient electrode, the resilient electrode extends upwards flatly, as will be called as the off-state. However, the application of voltage between the electrodes causes the resilient sheet electrode to be pulled towards the surface of the fixed electrode and cover the same in a moment as shown in double dot chain line, as will be called as the on-state. Since the resilient electrode flaps in this way on applying a voltage between the resilient and fixed electrode, various display can be realized when the appearance of the outer faces of the two electrodes are different, for example, in their reflectivity, color or patterns they carry from each other.

The above mentioned device is expected to be used in a wide variety of display since it has many advantages. For example, the device has memory function as well as complicated display function. In addition, the device requires less power. However, it is also true that the device is rather complicated and some difficulties are encountered when assembling.

For example, the least damage to the flatness of the resilient sheet electrode, which is preferably of the polymer film of about 8 microns in thickness as beforementioned, due to wrinkles or bends generated when the electrode is manufactured or assembled resists the smooth flapping of the resilient electrode. In particular, bonding of the resilient electrode to a base at one end thereof by the use of electrically conductive adhesive is apt to produce wrinkles at the bonded portion of the electrode. Drilling of holes through the resilient electrode and screwing the electrode to a base also damages the flatness of the electrode.

Another disadvantage involved in the prior device is related to the curved surface of the fixed electrode. For example, again referring to FIG. 1, since the uppermost portion B of the cylindrical fixed electrode has a substantially horizontal face, axial bright lines are very often seen around the uppermost portion B when the fixed electrode or the on-state resilient electrode is viewed from the above.

It is therefore an object of the invention, obviating the defects involved in the prior device as mentioned above, to provide an electrostatic display device in which a resilient sheet electrode is supported in such a manner that the smooth flapping of the resilient sheet electrode is ensured.

It is another object of the invention to provide an electrostatic display device generating no bright lines around the uppermost portion of the cylindrical surface of a fixed electrode or the on-state resilient sheet electrode.

It is still an object of the invention to provide an electrostatic display device simple in construction and assembling.

Other objects and features of the invention will be apparent from the following description with reference to the accompanying drawings, in which:

FIG. 1 is a front view of prior electrostatic display device;

FIG. 2*a* is a schematic view of an embodiment of electrostatic display device of the invention;

FIG. 2*b* is an enlarged front view of portions for supporting the resilient sheet electrode of FIG. 2*a;*

Throughout the drawings, similar parts and elements are shown by the similar reference numerals.

Figure 2A:
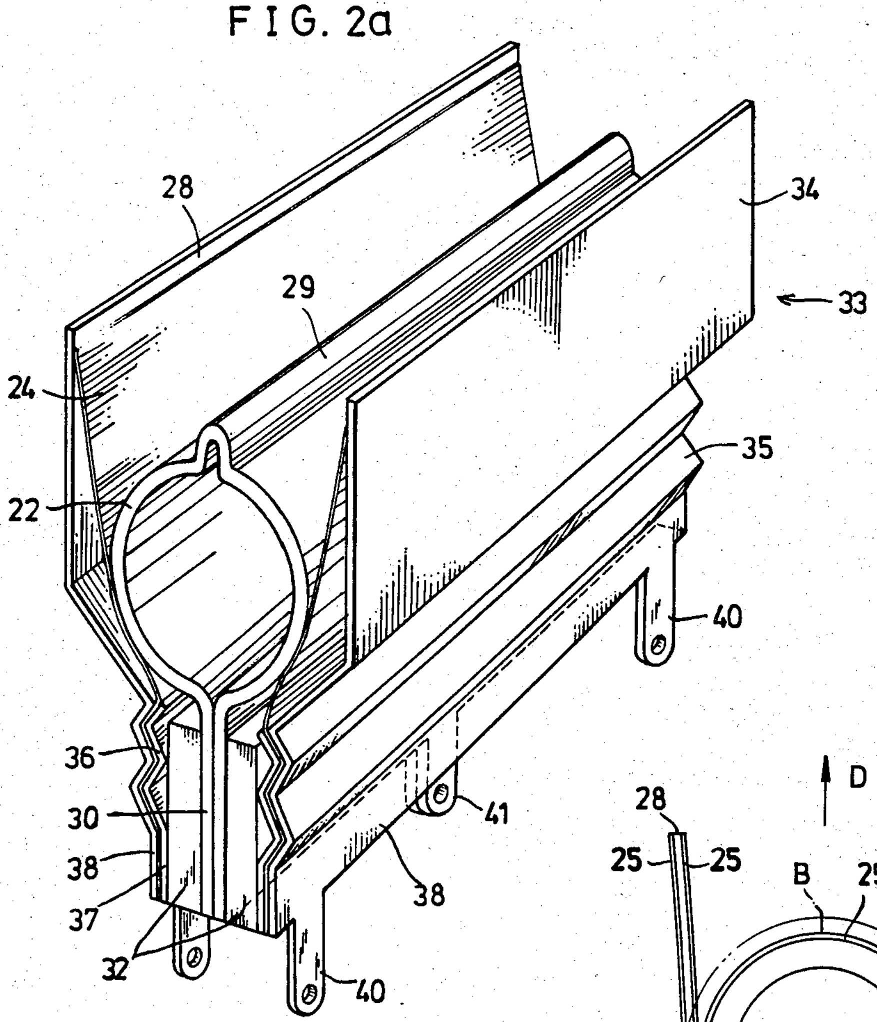
Figure 1:
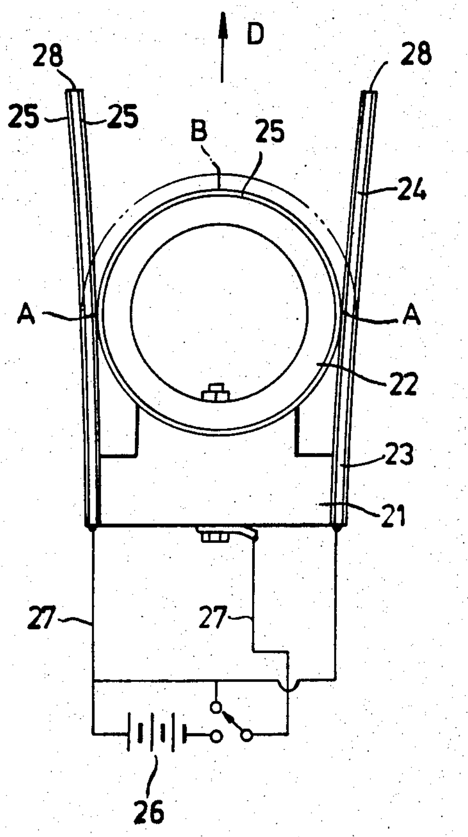
FIG. 1 PRIOR ART

Referring now to FIG. 2*a*, a fixed electrode 22 of pressed, electrically conductive metal sheet such as aluminium sheet, comprises an upper cylindrical portion 31 with an axial ridge 29 at the uppermost position thereof and a lower flange portion 30 extending downwards from the lower end of the cylindrical portion 31. The fixed electrode 22 is fixed to insulating base plates 32 at the flange portion 30.

Figure 2B:
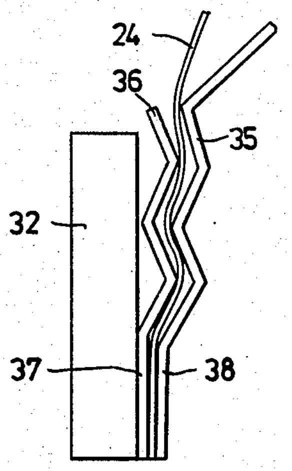

A casing 33 has a pair of upper side wall portions 34 opposite to each other and a pair of lower corrugated portions 35 each extending downwards from each side wall 34. As shown in FIGS. 2*a* and 2*b*, a corrugated supporting member 36 is fixed at the flat portion 37 thereof to each flat portion 38 of the corrugated portion 35 of the casing. In turn, each supporting member 36 is fixed at the flat portion 37 to the outer face of the base plate 32, so that there remains a space between the corrugated portions of the casing and the supporting member.

A resilient sheet electrode 24 is interposed between and fixed to the flat portions 37 and 38 of the supporting member 36 and the corrugated portion 35 of the casing 33, respectively, for example, by spot welding, at the lower end of the sheet electrode 24.

At least one of the outer surface of the fixed electrode 22 and the inner surface of the resilient sheet electrode 24 are covered or coated with a thin layer of insulating material, and preferably, at least the visual portion of the fixed electrode from the above is color painted. A d.c. power source is connected to the fixed electrode 22 and the resilient electrode 24 through lead wires so that a voltage can be applied therebetween. The resilient electrode 24 extends upwards from between the corrugated portion of the supporting member 36 and the casing 33, in contact with the fixed electrode at a portion, and when there is no electrical potential between the fixed and the resilient electrodes, the resilient electrode leans against the side wall 34 of the casing 33 at the free end 28 of the electrode 24, as shown in FIG. 2a.

As apparent, the casing 33 serves as a means of electrostatic shielding, position guide of the resilient electrode when it flaps, and protector for elements involved.

At the lower end of the casing 33 and the flange portion 30 of the fixed electrode, lugs 40 and 41 can be integrally formed so that the device can be readily fixed to a print circuit board by inserting the lugs into holes of the board and brazing, for example.

Figure 3:
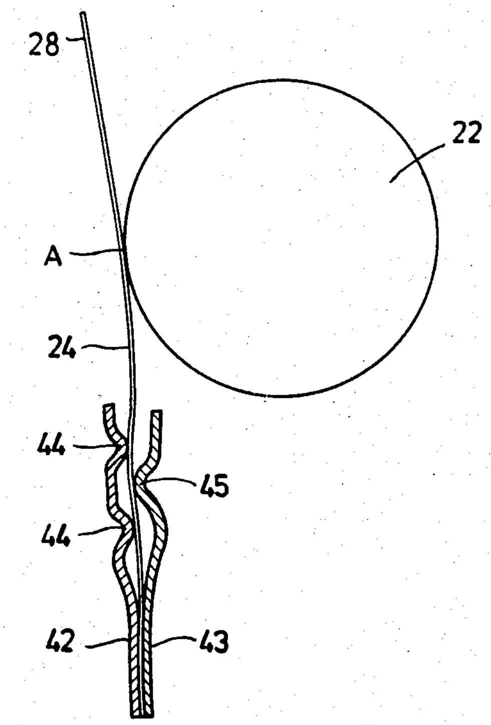
FIGS. 3 to 5 are partially sectional views of embodiments of members for supporting the resilient sheet electrode.

It will be apparent that any members can be used as a supporting means for the resilient electrode so far as the members are similar in function to the corrugated portions of the supporting member 36 and the casing 33. FIG. 3 shows one of such supporting members which comprises a first supporting member 42 and a second supporting member 43. The first supporting member 42 has two lateral projections 44 at an interval, and the second supporting member 43 has a lateral projection 45. The two supporting members 42 and 43 are disposed in such a manner that the projections 44 on one member 42 and the projection 45 on the other member 43 are in a complemental relationship, and are joined together at the lower ends thereof with the resilient sheet electrode 24 fixed therebetween, for example, by spot welding, bonding with electrically conductive adhesive, screwing, rivetting or by simply nipping therebetween. A lead wire, not shown, is connected to the supporting member.

Figure 4:
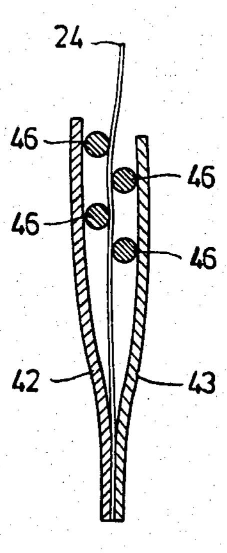
Figure 5:
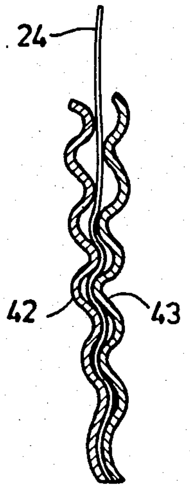

FIG. 4 shows another embodiment of the supporting members 42 and 43 which have wires 46 laterally fixed as projections in FIG. 3. Still another embodiment of the supporting members 42 and 43 are shown in FIG. 5 similar to the corrugated portions of FIG. 2 but having many corrugations.

According to the invention, however, it is enough that each of the supporting members 42 and 43 has at least one lateral projection on the inside thereof, and the members are disposed in such a manner that the projection on one supporting member and the projection on the other supporting member are in a complemental relationship, thus forcing the resilient electrode into contact with at least two projections. As a result, even if the resilient electrode is fixed to the supporting members, for example, by bonding with adhesives, thereby generating wrinkles or bends at the bonded portion of the electrode, the distortion in the flatness of the resilient sheet electrode due to the wrinkles or bends is released through the upward extension of the resilient electrode in a winding manner in contact with at least two projections or corrugations complementally disposed.

Figure 6:
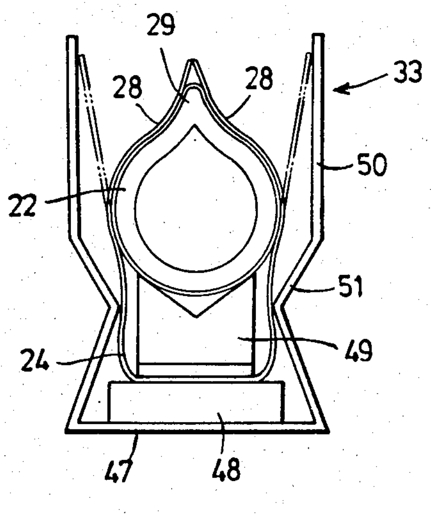
FIGS. 6 to 9 are front views of other embodiments of device of the invention.
Figure 8:
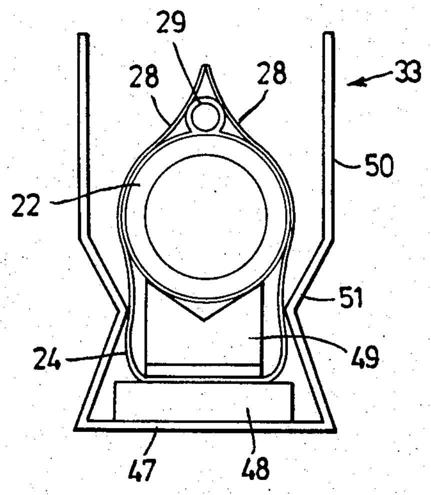
Figure 7:
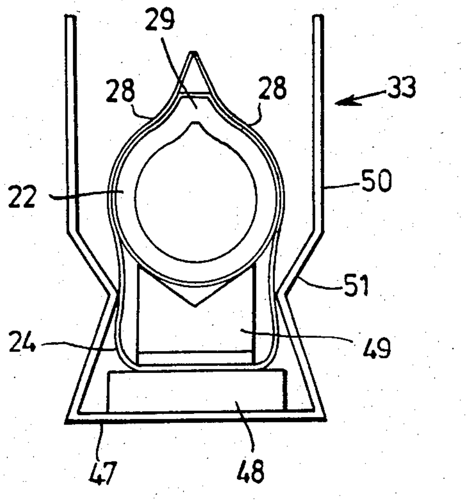
Figure 9:
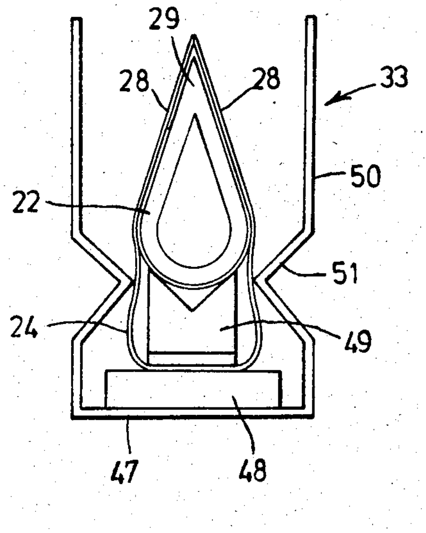

Meanwhile, FIGS. 6 to 9 illustrates other embodiments of electrostatic display device of the invention different in the shape of the ridge 29 and the casing 33 from the device shown in FIG. 2a. FIG. 6 shows a plateau-shaped ridge 29. Both sides of resilient sheet electrode, or flaps 24, abut against each other and form a acute angle therebetween in the on-state. As a result, there appears no bright lines around the uppermost portion of the on-state resilient electrode. A ridge 29 shown in FIG. 8 is a wire or the like bonded to the uppermost portion of the fixed electrode 22. FIG. 9 shows a further embodiment of ridge which is so formed integrally with the fixed electrode as to have a reverse V-shaped cross section.

In the embodiment shown in FIGS. 6 to 9, the fixed electrode 22 and the resilient electrode 24 are contained in the channel-shaped casing 33. Within the casing 33, there are provided a pair of plates 48 and 49 laid one on the other. The fixed electrode 22 is fixed to the plate 49 while the resilient electrode 24 is interposed between the plates 48 and 49 so that both sides of the resilient electrode or the flaps 24 are upturned along the inner faces of the side walls 50 of the casing 33. Each of the side walls has a laterally extending depression 51 at the lower portion thereof. The flap 24 is forced to come in contact with the depression 15 to be upturned, and with the outer face of the fixed electrode 22, further extending upwards.

Figure 10:
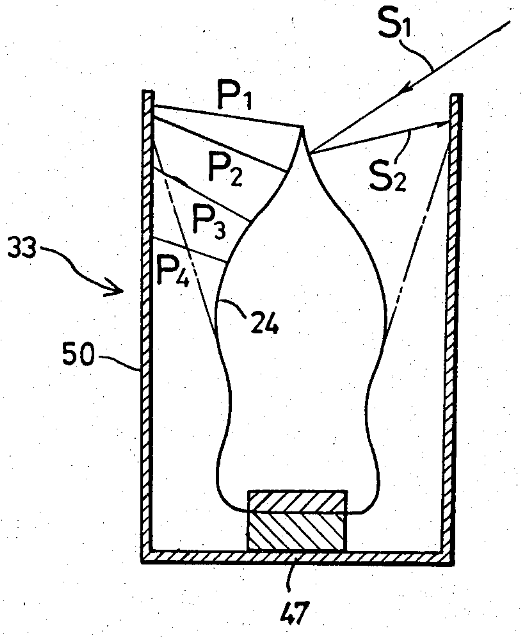
FIG. 10 is an explanatory front view of the resilient sheet electrode when it is in the on-state according to the invention.

As readily understood, the ridge 29 is so formed, in any one of the embodiments, that any perpendicular which is drawn outwardly on the face of the resilient electrode 24 in its on-state such as $P_1$, $P_2$, $P_3$ and $P_4$ shown in FIG. 10 intersects with the side wall 50 of the casing 33. In this way, if ambient light such as $S_1$ falls on the curved face of the resilient electrode in the on-state, the reflection light $S_2$ from the face necessarily strikes the side wall, preventing the reflection light from reaching an observer.

What is claimed is:

1. An electrostatic display device comprising:
a casing having at least one side wall;
a fixed electrode having a cylindrical surface;
at least one resilient sheet electrode supported by a pair of supporting panels opposite to each other, each of the panels having at least one lateral projection on the inner surface thereof, the panels being disposed in such a manner that the projection on one of the panels is alternate to that of the other, so that the resilient sheet electrode is forced into contact with at least one projection on each panel;
a layer of insulating material disposed between the electrodes; and
means for applying electrical power to the fixed and resilient electrodes, whereby upon the application of voltage to the electrodes, the resilient sheet electrode is attracted to the cylindrical surface of the fixed electrode and covers the same, changing the appearance of the device.

2. An electrostatic display device as claimed in claim 1, wherein the fixed electrode has an axial ridge at the uppermost portion of the cylindrical surface.

3. An electrostatic display device comprising:
a casing having at least one side wall;
a fixed electrode having a cylindrical surface and an axial ridge at the uppermost portion of the cylindrical surface;
at least one resilient sheet electrode standing adjacent to the fixed electrode along the inner surface of the side wall;
a layer of insulating material disposed between the electrodes; and
means for applying a voltage between the fixed electrode and the resilient sheet electrode, whereby upon the application of voltage between the electrodes, the resilient sheet electrode is attracted to the cylindrical surface of the fixed electrode and covers the same, changing the appearance of the device.

4. An electrostatic display device as claimed in claim 3, wherein the ridge is so formed that any perpendicular drawn outwardly on the outer surface of the resilient sheet electrode intersects with the side of the casing when the sheet electrode covers the fixed electrode.

* * * * *